United States Patent [19]

Fitts

[11] 4,326,800

[45] Apr. 27, 1982

[54] LASER BEAM WAVEFRONT AND LINE-OF-SIGHT ERROR CORRECTION SYSTEM

[75] Inventor: John M. Fitts, Santa Monica, Calif.

[73] Assignee: Hughes Aircraft Company, Culver City, Calif.

[21] Appl. No.: 146,958

[22] Filed: May 5, 1980

[51] Int. Cl.³ .............................................. G01B 11/26
[52] U.S. Cl. .................................... 356/152; 250/201; 356/153; 356/363
[58] Field of Search ................... 356/152, 153, 5, 363; 250/201

[56] References Cited

U.S. PATENT DOCUMENTS

| | | | |
|---|---|---|---|
| 3,902,036 | 8/1975 | Zaleckas | 219/121 L |
| 4,016,415 | 4/1977 | O'Meara | 250/201 |
| 4,102,572 | 7/1978 | O'Meara | 356/152 |
| 4,140,398 | 2/1979 | Hodder | 356/152 |
| 4,146,329 | 3/1979 | King et al. | 356/152 |
| 4,168,908 | 9/1979 | Cubalchini | 356/363 |

*Primary Examiner*—S. C. Buczinski
*Attorney, Agent, or Firm*—William J. Benman, Jr.; William H. MacAllister

[57] ABSTRACT

An auto-alignment system for high energy lasers wherein a low energy reference beam is provided at the vertex of a primary mirror that is grated to diffract a low energy holographic replica of the high energy beam. A photodetector based servo-control system compares the line-of-sight of the reference beam to that of the low energy replica and generates control signals which actuate a beam steering mirror to reposition the main beam. The servo-control system also includes a wavefront sensor. This sensor analyzes the wavefront profile of the low energy replica and generates control signals which actuate a deformable mirror to correct spurious wavefront aberrations.

5 Claims, 2 Drawing Figures

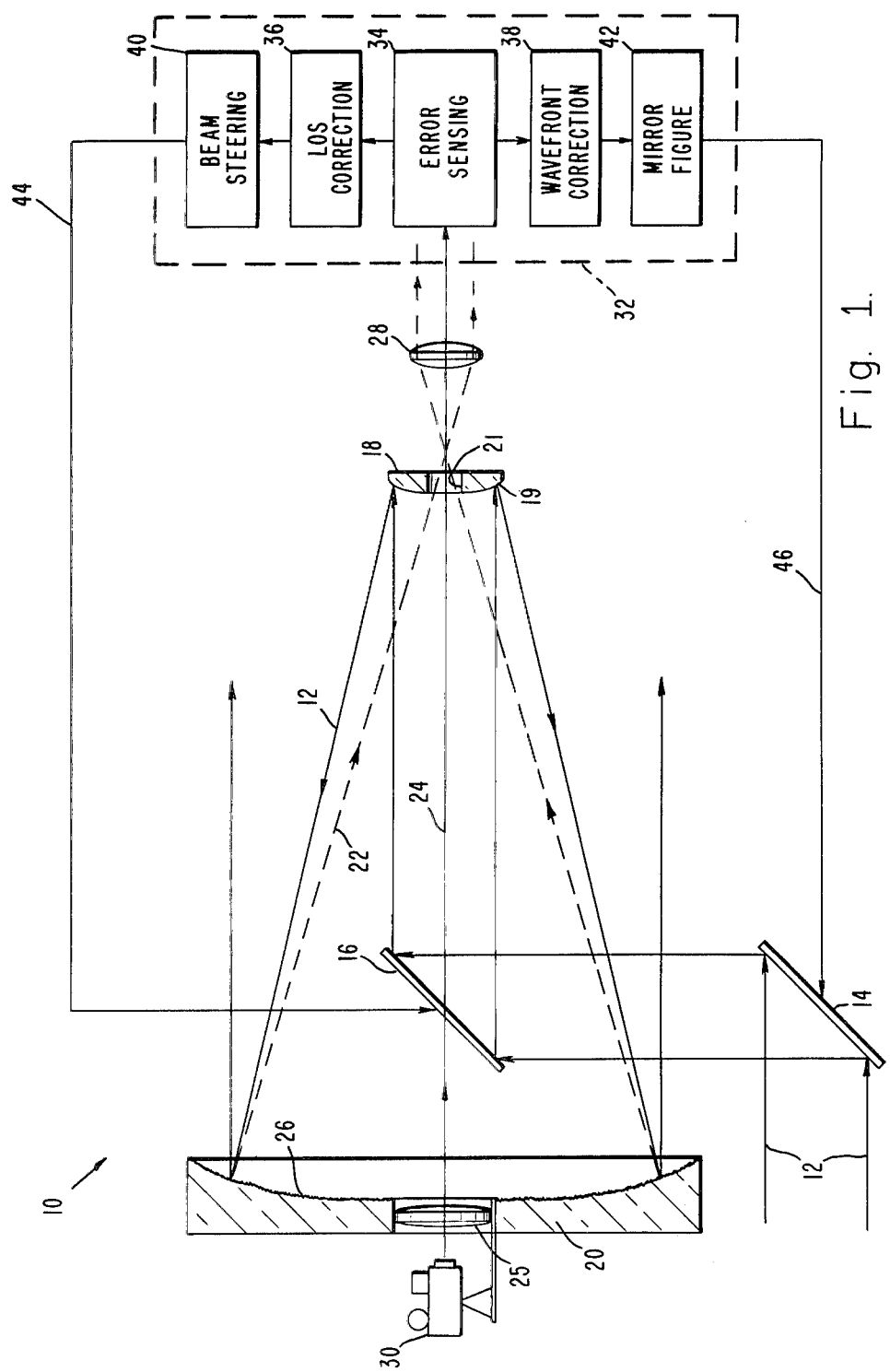

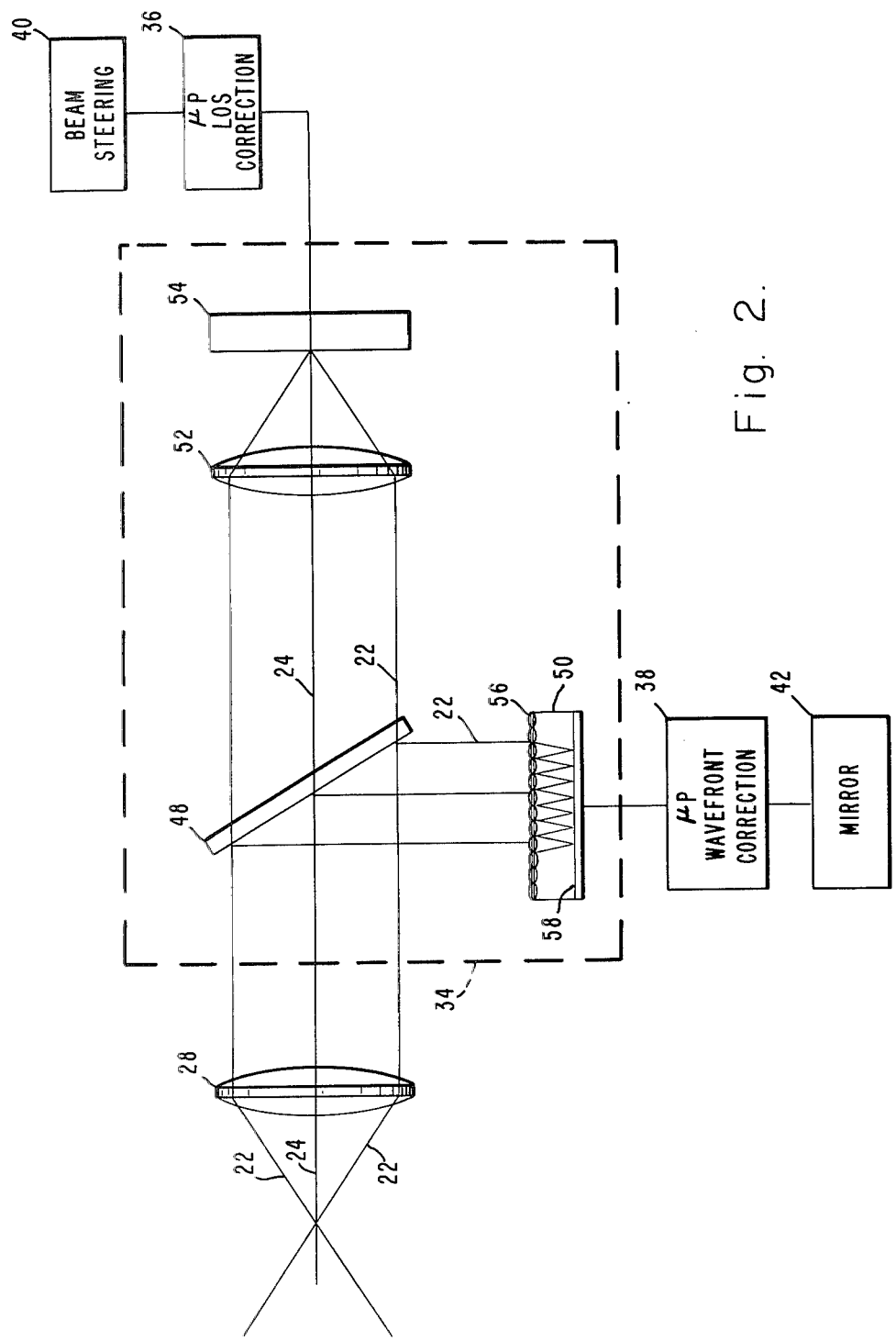

LASER BEAM WAVEFRONT AND LINE-OF-SIGHT ERROR CORRECTION SYSTEM

BACKGROUND OF THE INVENTION

1. Field of the Invention

This invention relates to laser systems. More specifically, it relates to improved laser systems that provide automatic correction of tilt and focus errors in laser beams.

While the present invention is described herein with reference to specific embodiments, it should be understood that the invention is not limited thereto. The principles of the present invention may be adapted and employed for a variety of requirements as those skilled in the art will recognize in light of the present disclosure.

2. Description of the Prior Art

Laser systems enjoy a wide variety of applications and promise a suitability for many others. Many applications require precise control of the direction and wavefront profile of the main laser beam. A wavefront is a three-dimensional surface of constant optical path length, orthogonal to a family of rays. Typical aberarations in the wavefront profile include those that change the focus, phase or astigmatic characteristics of the beam. Control of these distortions as well as the line-of-sight (tilt) of the main beam may be required in applications involving long distance communication and guidance of weapons systems. This is problematic insofar as the telescope invariably experiences microvibrations induced by the ambient environment. Such vibrations can seriously impair the performance of system.

In addition, the laser beam may be undesireably affected by distortions in the primary mirror or irregularities in the optical train between the laser source and the telescope. There are currently at least two approaches to this problem. One is to use four collimated pilot or auto-alignment beams in parallel with the primary beam. With this approach, the optical train is adjusted so that when it is properly aligned the pilot beams follow the optical train through the primary and secondary mirrors of the telescope and impinge upon several sensors gyro-stabilized along a vector in the line-of-sight (LOS) of the radar beam. The sensors provide signals to a servo-system which effectively corrects the aberration.

Such systems are costly and cumbersome in that additional laser beams, sensors, and optical components must be provided and each must be properly aligned.

Another approach utilizes a stabilized ring alignment concept. Here an annular reference mirror is disposed outside the primary mirror of the telescope so as to circumscribe the main laser beam. An auto-alignment beam parallel with the main beam, is reflected by the mirrored ring to a suitably located sensor. Here again, the sensor provides corrective signals to a servo-subsystem to compensate for the error. The auto-alignment ring can be quite large, and the fact that it must be inertially stabilized to high accuracies poses a limitation on the feasibility of this approach.

More importantly, while both the four beam autoalignment systems and the stabilized ring alignment systems provide a line-of-sight error correction capability, neither system can effectively detect wavefront aberrations arising from highly localized microdistortions in the optical train including the reflective surface of the primary mirror. The annular ring technique typically samples 1-10 percent of the aperture of the beam. The four beam auto-alignment systems typically sample 0.5 percent of the full aperture. Thus, the auto-alignment beams illuminate only a small portion of the reflective surface of the primary mirror.

Thus, it is a general object of the present invention to provide an improved automatic laser beam alignment system. It is a more specific object of the present invention to provide an improved laser beam alignment system that corrects line-of-sight and wavefront errors. An even more specific object of the present invention is to provide an improved automatic laser beam alignment system that is capable of correcting both distortions in the optical train and wavefront aberrations caused by microdistortions in the full aperture of the primary mirror. A still further object of the present invention is to achieve the above-identified objects with a small, simplified, economical error correction package that need not be inertially stabilized. These and other objects will become apparent upon consideration of the description which follows.

SUMMARY OF THE INVENTION

The objects of this invention are achieved by an auto-alignment system in which a sample beam is extracted from the main beam which has a fixed orientation relative to the main beam. A stabilized reference beam is also provided. The line-of-sight of the reference beam is compared to that of the sample beam by a sensor package. The sensor package provides control signals to a servo-system which repositions the main beam until the sample beam is aligned with the reference beam.

In the preferred embodiment, a grating is provided on the primary mirror so that when the main laser beam illuminates the primary mirror the sample beam is diffracted by the gratings onto the sensor. The grating pattern is predetermined so that the sample beam accurately maps the orientation and characteristic profile of the main beam. The main beam is substantially unchanged by the gratings and is reflected on to the target. In effect the sample beam is a smaller duplicate of the main beam spatially displaced.

The extraction of a sample beam from the main beam by placing a grating on the primary mirror effectively allows the surface of the primary mirror to be examined by the main beam. That is, distortions on the primary mirror within the illuminated area which cause distortions in the main and sample beams can be detected by the sensor package.

BRIEF DESCRIPTION OF THE DRAWING

FIG. 1 is a diagrammatic view of a laser system employing the principles of this invention.

FIG. 2 is an expanded view of the error sensing circuit of the preferred embodiment.

DETAILED DESCRIPTION OF THE INVENTION

FIG. 1 shows the beam correction system 10 of the present invention. The incoming rays of the main beam 12 are shown impinging upon the reflective surface of a deformable mirror 14. Deformable mirrors are useful in many laser applications because such mirrors provide variable control of the contour of the reflective surface. This provides the capability to modify the beam to correct wavefront errors such as focus.

In reference once again to FIG. 1, rays 12 are reflected from deformable mirror 14 to a rigid planar surfaced beam steering mirror 16. Steering mirror 16 is disposed so as to reflect rays 12 from the deformable mirror 14 to a secondary mirror 18. The steering mirror 16 can be located anywhere in the optical train prior to the primary mirror.

Secondary mirror 18 has a non-planar reflective surface 19 effective to reflect the beam 12 to a grated primary mirror 20. Secondary mirror 18 is shown in cross-section to reveal an aperture 21 through which a sample beam 22, a reference beam 24, and a portion of the main beam 12 pass in a manner discussed more fully below. Mirrors 14 and 16 have actuating mechanisms not shown.

The sample beam 22 is generated by the diffraction of the main beam 12 by the grated metallic mirrored surface 26 of the primary mirror 20. The grating 26 of the primary mirror 20 consists of a series of non-intersecting shallow grooves etched into the concave reflective surface of the metallic substrate of the mirror 20. Holographic surface grating fabrication consists of a material preparation process and two exposure steps. First, a photoresist such as Shipley AZ1350B is coated on the desired substrate. For beam samplers, the substrate consists of the reflective surface at which the surface grating will sample the incident beam. In the next step, a coherent exposure (at 441.6 nm, for example) records the required interference pattern in the photoresist layer. In the developing process, Shipley AZ developer is used to remove photoresist at a rate determined by the local exposure of the photoresist layer. The interference pattern is therefore recorded as a surface relief pattern in the developed photoresist. As a result, all the photoresist is etched away in heavily exposed areas and very little is removed in lightly-exposed areas. This photoresist pattern then serves as a mask for the second exposure step, in which an ion beam etches the surface grating into the underlying reflective layer.

The efficiency of the final grating is determined by the depth and profile of the ion-etched grooves in the substrate. This profile is, in turn, highly dependent on the profile of the photoresist grating mask. Because these gratings consist of lines comparable to wavelength dimensions, good process control of each step is essential.

Typical experimental parameters for layers of photoresist and substrate are shown in Table 1. In general, the photoresist can be either spin-coated or dip-coated onto the substrate. The volatile solvent in the photoresist solution liquifies the material for application to the substrate. After coating, the photoresist is dried at 70°-80° C. to remove all volatile solvents, which can cause variations in sensitivity.

TABLE I

EXAMPLES OF PHOTORESIST AND SUBSTRATE LAYERS USED IN EXPERIMENTS.

| | Typical Material | Thickness, Å |
|---|---|---|
| Photoresist | Shipley 1350B | 2500–3500 |
| Reflective Substrate (Beam Sampling Surface) | Gold | 4000–5000 |
| Base | Glass | |

Spin-coating is a method whereby the liquid photoresist is deposited on the substrate and the substrate is spun at a constant speed to produce a uniform coating. The variables which determine the photoresist thickness are the initial photoresist concentration and the spin rate. With dip-coating the substrate is extracted from a solution of photoresist at a constant rate ("dip-drawing") or the substrate is held stationary while the solution is drained away ("dip-draining"). The variables which determine the thickness in this case are the photoresist concentration and the pull rate or drain rate. Some typical thickness data are shown in Table 2.

Although these results are repeatable under similiar conditions, the thickness depends on the surface conditions as well as the size of the substrate. Therefore, representative films for each batch of material prepared were always measured by a Dektac machine to obtain accurate thickness information. For the most part, photo-resist thicknesses in the range of 2500 to to 3500 Å were used. This initial thickness determines the depth to which the reflective substrate can be etched in the ion-beam machining exposure.

TABLE 2

Photoresist Thickness Data

Spin coating
  Concentrated Shipley 1350B
  Filtered
  Substrate-gold on 2 inch diameter silicon wafers
  5,000 RPM-Photoresist thickness 2800 Å
Dip-draw coating
  Concentrated Shipley 1350B
  Substrate-glass 2×3 inches
  1 inch/20 seconds-Photoresist thickness 5600 Å
  1 inch/25 seconds-Photoresist thickness 4500 Å
  1 inch/30 seconds-Photoresist thickness 4000 Å

After being applied to the substrate, the photoresist is exposed to the interference of two construction beams. The groove locations are thus defined by the maxima or minima of the interference pattern produced by the two mutually coherent wavefronts of the construction beams. In the preferred embodiment, the grooves follow curved lines and their spacing (period) varies with position.

The process by which these gratings are fabricated is described more fully in an interim report published by the Rome Air Development Center in March of 1979. See "Holographic Grating Study-Hughes Aircraft Company" RADC-TR-78-279, Vol. 1. This publication is incorporated herein by reference.

It is well known to those skilled in this art that when a holographic grating is illuminated with a coherent wavefront (i.e. laser beam), part of the incident beam is unaffected by the grating and is reflected from the substrate as a zeroth order of diffraction. A small fraction of the incident energy is lost to absorption and random scattering in the grating. The remaining energy is diffracted by the grating into the various non-zero orders that can exist according to a grating equation.

The fraction of incident energy diffracted into a single specified order is given by the diffraction efficiency for that order. Diffraction efficiency is a function of several parameters including the depth, shape, and period of the grooves as well as the wavelength, angle of incidence, and polarization of the incident beam. As the preferred embodiment was designed for high energy laser applications, a low diffraction efficiency holographic grating utilizing a first order of diffraction was etched upon the metallic substrate of the primary mirror 20.

While it is understood that the present invention is particularly well suited for high energy laser applications, it is contemplated that the principles thereof may be employed in low energy laser applications as well.

The zeroth order beam from a holographic grating, in this case the main beam 12, is unaffected, that is, undistorted by the presence of the grating. In addition, the diffracted beam, in this case the sample beam, is a true phase replica of the incident wavefront. This property of holographic gratings is responsible for the low power wavefront sample beam 22 which accurately maps the phase and relative amplitude distributions of the main beam 12.

As shown in FIG. 1, the sample beam 22 passes through the aperture 21 in the secondary mirror 18 to a convex lens 28. The lens 28 collimates the sample beam 22 with the pilot or reference beam 24. The pilot beam 24 is emitted by an inertially stabilized source 30. The pilot beam 24 is coaxially aligned to the primary mirror 20 in its nominal on-axis pointing configuration and is steered off-axis, during dynamic operation, in the desired direction. The desired direction is established by some other means such as by operative command from a tracker. The pilot beam establishes a reference for tilt (LOS) control. The pilot beam 24 is tagged or modulated so that it can be discriminated from the sample beam 22 by the sensor package 32. Lens 28 directs the collimated sample beam 22, and reference beam 24, to the sensor package 32. The central ray of the main beam 12 is filtered out by an aperture (not shown) in the deformable mirror 14 which allows it to pass to an absorbing material (not shown) or by other suitable techniques.

The sensor package 32 includes an error sensing unit 34, a line-of-sight correction circuit 36, a wavefront error correction circuit 38, a beam steering mirror driving circuit 40, and a mirror figure driving circuit 42.

Tilt and wavefront error detection can be accomplished by any of several known techniques. FIG. 2 shows the tilt and wavefront error detection mechanisms of the error sensing unit 34 of by the preferred embodiment. Rays of the sample beam 22 are collimated to the reference beam 24 by the lens 28 and directed to a beam splitting mirror 48. The beam splitting mirror 48 splits the sample beam 22 and the reference beam 24 so that each beam is directed to the wavefront sensor 50 and the tilt error detector 52 via the lens 54.

The wavefront sensor 50 is shown diagrammatically as a Hartmann sensor. Any suitable wavefront sensor (i.e., shearing interferometer) could be used without departing from the scope of the present invention.

As discussed by John W. Hardy in "Active Optics: A New Technology for the Control of Light" in *Proceedings of the IEEE*, Vol. 66, pp. 691, June 1978, the Hartmann sensor 50 uses a plurality of lenses 56, mirrors and prisms (not shown) in combination with an array of quadrant detectors to provide direct wide bandwidth wavefront slope measurement in the image plane. The lens of the Hartmann sensor 50 divides the incoming beams 22 and 24 into a number of subapertures in which the dominant wavefront distortion is a first order tilt. In the detector plane 58 of the Hartmann sensor 50, one quadrant detector (not shown) is provided for each lens 56 which measures the local tilts of the wavefronts of beams 22 and 24. The wavefront correction circuit 38 includes circuitry such as a microprocessor which reconstructs the wavefront measured by the sensor 50 by effecting a two-dimensional spatial integration of the array of phase differences that define the local slope of the wavefront in two dimensions.

Control signals generated by the wavefront correction circuit 38 are converted and amplified by the mirror figure driving circuit 42 to provide corrective driving signals for the deformable mirror 14.

Lens 52 focuses the sample beam 22 and the reference beam 24 on the detector array 54. The reference beam 24 may be modulated or tagged by some other suitable technique to make it distinguishable from the sample beam 22. The detector array 54 is coupled to the LOS correction circuit 36.

The LOS correction circuit 36 includes circuitry such as a plurality of bandpass filters or demodulators and a microprocessor to distinguish the sample beam 22 from the reference beam 24 and generate LOS error correction signals indicative of the spatial separation of the two beams. These signals are converted and amplified by the conventional circuitry of beam steering mirror driver 40 to generate actuating signals for the beam steering mirror 16.

The signals generated by the LOS correction circuit 36 actuate the beam steering mirror so that the main beam 12 and the resulting sample beam 22 are driven until the sample beam 22 is focused on the same point on the detector array 54 as the reference beam 24.

The package design shown in FIG. 1 is merely representative of a system that could be employed to realize the advantageous teachings of the present invention. Any suitable sensor package could be employed without departing from the true spirit and scope of this invention.

In operation, the chief rays of the main beam 12 from a source (not shown) are directed to and deflected by the deformable mirror 14 to the beam steering mirror 16. The beam steering mirror 16 directs the beam 12 to the secondary mirror 18. The secondary mirror 18 deflects the beam 12 to the primary mirror 20. A full aperture first order wavefront sample 22 of the main beam 12 is diffracted from the holographic grating 26 on the primary mirror 20 through the aperture 21 in the secondary mirror 18 to lens 28. The zeroth order component of the main beam 12 is directed toward the target by the primary mirror 20. Lens 28 focuses the sample beam 22 on the target 34 of the sensor package 32.

A reference beam 24 is directed from a source 30 through the aperture 21 in the secondary mirror 18 to the lens 28. The lens 28 focuses the sample beam 22 and the reference beam 24 on the target 34 of the sensor package 32.

A line-of-sight error in the main beam 12 would be represented in the sample beam 22. This would be detected by the error sensing circuit 34 in the manner discussed above. An error signal would then be transmitted from the error sensing circuit 34 to the LOS error correction circuit 36. The LOS correction circuit 36 would then generate the directional signal input to the beam steering mirror actuator driving circuit 40. The LOS error correction loop would be completed by the path 44 between the beam steering mirror driver 40 and the actuators (not shown) of the beam steering mirror 16.

Similarly, since the holographic sample beam 22 accurately maps the phase and relative amplitude distributions of the main beam 12, the sample beam 22 provides the instantaneous wavefront profile of the main beam 112. As discussed above, wavefront errors are detected by the error sensing circuit 34 and input to the wavefront error correction circuit 38. The corrective control signals generated by the wavefront correction circuit 38 are transmitted to the mirror figure control circuit 42. Appropriate control signals are transmitted to the actuators (not shown) of the deformable mirror 14 via path 46 to correct the wavefront aberrations of the main beam 12.

Nominal values for the system parameters are tabulated below.

| Parameter | Value |
| --- | --- |
| Primary Mirror f/number | 0.8 to 4 |
| Beam Steering Angle | 0.5 to 4 $\mu$RAD |
| Beam Expander Magnification | 5 and 10 |
| Outgoing Beam Diameter | 1.0 m |
| Main Beam Wavelength | All optical wavelengths |
| Reference Beam Diameter | 2 cm |
| Reference Beam Wavelength | 0.5 $\mu$m (nominally) |
| Holographic Grating Construction Wavelength | 0.7 $\mu$m |
| Telescope Types | Ellipitical Primary Spherical Secondary Two Cofocal Parabolas |

Even though the present invention has been described with reference to a particular embodiment, it should be understood that the invention is not limited thereto. The principles of the present invention may be employed to secure the advantages thereof in a manner that is obvious to those having ordinary skill in the art.

For example, the principles of the present invention may be adapted to meet the requirements of any application where a coherent wavefront must be precisely aligned toward a target area. In addition, the deformable mirror of this invention may be replaced by any reflective surface which provides control of the contour of the reflective surface without departing from the principles disclosed herein.

Furthermore, the holographically grated primary mirror could be replaced by a flat non-grated mirror or a mangun mirror (a mirror having a diffracting lens on its surface). Moreover, the sample beam could be diffracted to a detector that is not coaxial with the primary mirror. And, as mentioned above, the specific design of the sensor package, is not critical.

It is therefore comtemplated by the appended claims to cover these and any other modifications and embodiments which constitute the essential features of this invention.

I claim:

1. A system for directing an applied main laser beam along a preselected path, said system comprising:
    beam sampling means for deriving from the main laser beam a sample laser beam which has a fixed preselected spatial orientation relative to the main laser beam;
    laser means for providing a spatially stabilized pilot laser beam;
    first sensor means, disposed to intercept at least a portion of the sample and pilot laser beams, for providing position control signals corresponding to the spatial orientation therebetween; and
    first beam control means responsive to the position control signals for repositioning the main laser beam so as to cause a preselected spatial orientation to exist between the sample and pilot laser beams; whereby the main laser beam is positioned and maintained at a preselected orientation relative to the pilot laser beam.

2. The system of claim 1 wherein said beam sampling means includes means for providing a sample beam which has substantially the same wavefront as the main beam;
    second sensor means disposed to intercept at least a portion of the sample beam and provide wavefront control signals which correspond to the wavefront profile of the sample beam; and
    second beam control means responsive to said wavefront control signals for adjusting the wavefront of said main beam so as to reduce wavefront errors therein.

3. The system of claim 2 wherein said means for providing a sample beam includes a holographically grated mirror.

4. A system for maximizing the power density of a main laser beam on a target comprising:
    beam sampling means for deriving from the main laser beam a sample laser beam which has a fixed preselected spatial orientation relative to the main laser beam and a wavefront substantially identical to that of the main laser beam, said beam sampling means including a holographically grated primary mirror;
    laser means for providing a spatially stabilized pilot laser beam;
    first sensor means disposed to intercept at least a portion of the sample and pilot laser beams for providing position control signals corresponding to the spatial orientation therebetween;
    second sensor means disposed to intercept at least a portion of the sample beam and provide wavefront control signals which correspond to the wavefront profile of the sample beam;
    first beam control means responsive to the postion control signals for repositioning the main laser beam so as to cause a preselected spatial orientation to exist between the sample and pilot laser beams whereby the main laser beam is positioned and maintained at a preselected orientation relative to the pilot laser beam; and
    second beam control means responsive to said wavefront control signals for adjusting the wavefront of said main beam whereby wavefront errors in said main laser beam are minimized.

5. A method for continuously automatically aligning a laser beam relative to a target and maximizing the power density of said laser beam at said target including the steps of:
    (1) directing a reference laser beam from a stabilized source to a conveniently located sensor package;
    (2) extracting a sample laser beam from said main laser beam at a fixed spatial orientation relative thereto and focusing it on said sensor package;
    (3) comparing the orientation of said sample beam to the orientation of said reference beam to provide position control signals;
    (4) utilizing said position control signals to reposition said main and sample laser beams to preselected orientations relative to said reference beam;
    (5) analyzing the wavefront profile of said sample beam to provide wavefront error correction signals;
    (6) utilizing said wavefront error correction signals to change the wavefront profile of the main and sample laser beams.

* * * * *